(12) United States Patent  
Englund et al.

(10) Patent No.: US 8,144,990 B2
(45) Date of Patent: Mar. 27, 2012

(54) TRANSLATION AND DISPLAY OF TEXT IN PICTURE

(75) Inventors: Hakan Mats Englund, Stockholm (SE); Simon Lessing, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1300 days.

(21) Appl. No.: 11/689,673

(22) Filed: Mar. 22, 2007

(65) Prior Publication Data

US 2008/0233980 A1   Sep. 25, 2008

(51) Int. Cl.
*G06K 9/00*   (2006.01)
(52) U.S. Cl. ........................................ 382/181
(58) Field of Classification Search .................. 382/181, 382/231
See application file for complete search history.

(56) References Cited

U.S. PATENT DOCUMENTS

| 6,249,283 | B1 * | 6/2001 | Ur ................................. | 715/764 |
| 2001/0056352 | A1 * | 12/2001 | Xun ............................... | 704/277 |
| 2002/0191847 | A1 * | 12/2002 | Newman et al. .............. | 382/176 |
| 2003/0125927 | A1 |  7/2003 | Seme | |
| 2003/0200078 | A1 * | 10/2003 | Luo et al. .......................... | 704/2 |
| 2005/0221856 | A1 | 10/2005 | Hirano et al. | |

FOREIGN PATENT DOCUMENTS

| DE | 103 36 320 A1 | 3/2005 |
| EP | 1 507 129 A1 | 2/2005 |
| JP | 2000-23012 | 1/2000 |
| JP | 2000-207401 | 7/2000 |
| WO | WO 03/032237 A1 | 4/2003 |

OTHER PUBLICATIONS

International Search Report and Written Opinion dated Mar. 20, 2008 issued in corresponding PCT application No. PCT/IB2007/053665, 14 pages.

Hiromichi Fujisawa et al.: "Information Capturing Camera and Developmental Issues". Proceedings of the Fifth International Conference on Document Analysis and Recognition. ICDAR '99. Sep. 1999, pp. 205-208.

Yasuhiko Watanabe et al.: "Translation Camera on Mobile Phone". Proceedings 2003 International Conference on Multimedia and Expo, vol. 2. ICME '03. Jul. 2003, pp. 177-180.

Notification of Transmittal of the International Preliminary Report on Patentability for International Application No. PCT/IB2007/053665 mailed on Jul. 20, 2009.

* cited by examiner

*Primary Examiner* — Brian Q Le
*Assistant Examiner* — Edward Park
(74) *Attorney, Agent, or Firm* — Snyder, Clark, Lesch & Chung LLP

(57) ABSTRACT

A method performed by a mobile terminal may include receiving an image that includes text, translating the text into another language and superimposing and displaying the translated text over the received image.

14 Claims, 10 Drawing Sheets

TRANSLATION AND DISPLAY OF TEXT IN PICTURE

TECHNICAL FIELD OF THE INVENTION

Systems and methods described herein generally relate to communications devices and, more particularly, to displaying text by communications devices.

DESCRIPTION OF RELATED ART

Communications devices, such as cellular telephones, have become increasingly versatile. For example, cellular telephones often include camera functions that that enable users to take pictures that capture a digital image. At the present time, camera features employed on cellular telephones and portable communications devices are limited to capturing and transmitting the image.

SUMMARY

According to one aspect, a method comprises receiving an image that includes text; translating the text into another language; and superimposing and displaying the translated text over a portion of the received image.

Additionally, the method may further comprise performing optical character recognition (OCR) processing on the received image.

Additionally, the method may further comprise receiving input from a user selecting a language for performing the OCR processing.

Additionally, the method may further comprise receiving input from a user selecting the another language.

Additionally, the received image may include at least one of a digital image or a video stream.

Additionally, the translated text may be displayed in a more prominent manner than the text in the received image.

Additionally, the translating the text into another language may be performed by a server and wherein the displaying the translated text over a portion of the received image is displayed on a mobile terminal.

According to another aspect, a mobile terminal is provided. The mobile terminal comprises a camera configured to produce an image; a display; and logic configured to: receive the image from the camera, perform optical character recognition (OCR) on the image to produce text, translate the text into another language, and control the display to display the translated text.

Additionally, the logic may be further configured to superimpose and display the translated text over at least a portion of the received image.

Additionally, the logic may be further configured to receive a selection of a language associated with the OCR processing.

Additionally, the logic may be further configured to receive a selection of the another language.

Additionally, the logic may be further configured to display the translated text in substantially the same size as text within the received image.

Additionally, the logic may be further configured to display the text in the received image in a dimmed or less prominent manner than the translated text.

According to another aspect, a method is provided. The method comprises receiving an image; performing optical character recognition (OCR) processing on the received image to produce text in a first language; translating the text in the first language into text in a second language; displaying the received image in a dimmed manner; and superimposing and displaying the text in the second language over the displayed received image.

Additionally, the method may further comprise receiving a selection identifying the first and second languages.

Additionally, the performing OCR processing on the received image may be performed by a server.

Additionally, the displaying the text in the second language may comprise displaying the text on a mobile terminal located remotely from the server.

Additionally, the method may further comprise transmitting the received image to the server.

Additionally, the method may further comprise transmitting text in the first language from the server to a mobile terminal.

Additionally, the superimposed and displayed text in the second language may include more than one size of text.

Other features and advantages of the systems and methods described herein will become readily apparent to those skilled in this art from the following detailed description. The implementations shown and described provide illustration of the best mode contemplated for carrying out the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description refers to the accompanying drawings. The same reference numbers in different drawings identify the same or similar elements. Also, the following detailed description does not limit the systems and methods described herein. Instead, the scope of the invention is defined by the appended claims and their equivalents.

Figure 1:
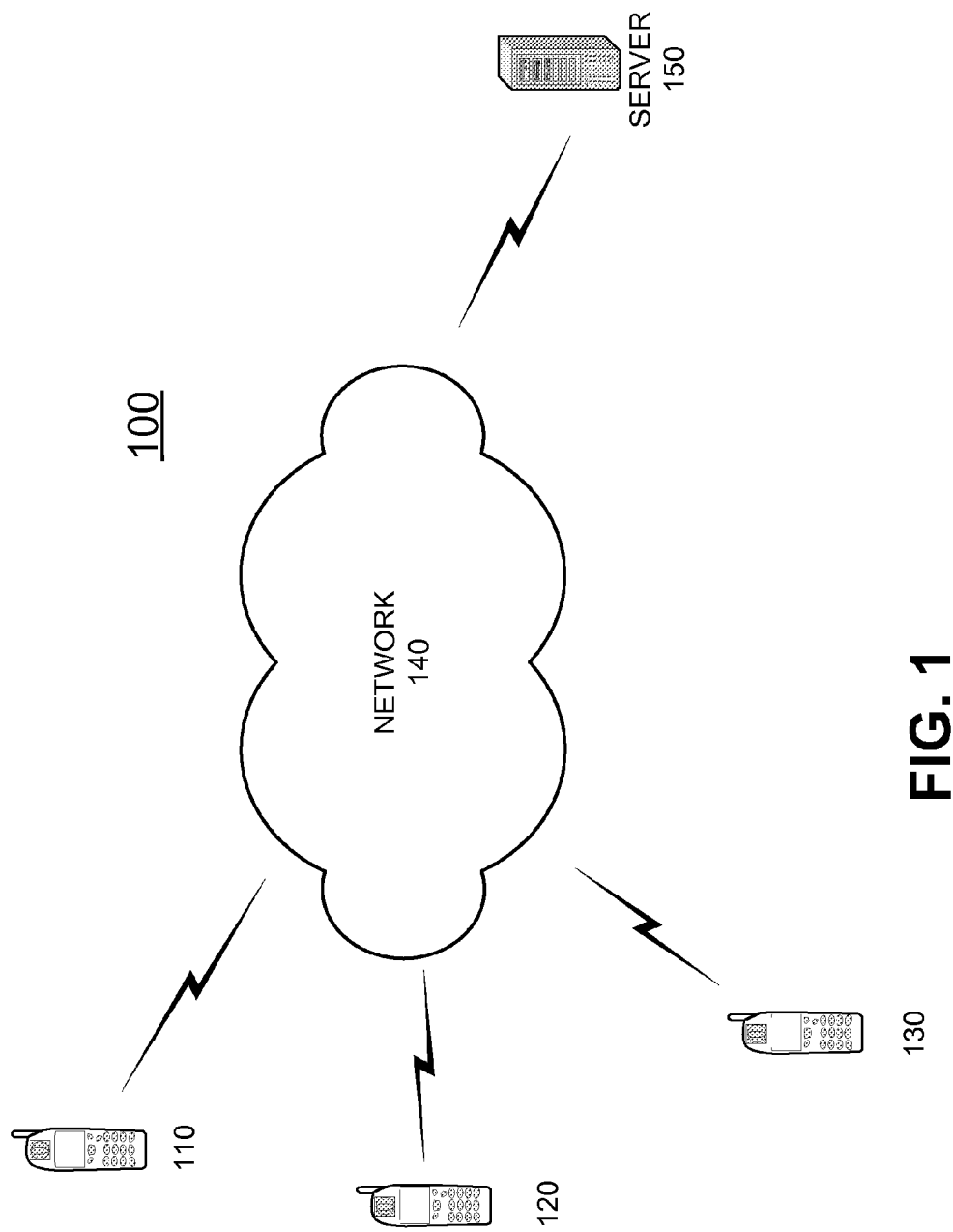
FIG. 1 is a diagram of an exemplary system in which methods and systems described herein may be implemented.

FIG. 1 is a diagram of an exemplary system 100 in which methods and systems described herein may be implemented. System 100 may include mobile terminals 110, 120 and 130, network 140, and server 150. It should be understood that system 100 may include other numbers of mobile terminals and servers. System 100 may also include a number of base stations and base station antennas used to transmit information between mobile terminals 110-130.

The methods and systems described herein may be implemented in the context of a mobile terminal such as one or more of mobile terminals 110, 120 or 130. As used herein, the term "mobile terminal" may include a cellular radiotelephone with a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver, a radio (AM/FM) receiver; and a laptop and/or palmtop receiver or other appliance that includes a radiotelephone transceiver. Mobile terminals may also be referred to as "pervasive computing" devices that are capable of communicating with other devices via Short Messaging Service (SMS) protocols or other protocols that allow for simultaneous communications of voice, data, music and video information.

Network 140 may include one or more networks including a cellular network, such as a Global System for Mobile communications (GSM) network, a satellite network, the Internet, a telephone network, such as the Public Switched Telephone Network (PSTN), a metropolitan area network (MAN), a wide area network (WAN), or a local area network (LAN). Mobile terminals 110, 120 and 130 may communicate with each other over network 140 via wired, wireless or optical connections.

In an exemplary implementation, network 140 includes a cellular network used for transmitting data and messages between mobile terminals 110-130. For example, components of a cellular network may include base station antennas (not shown) that transmit and receive data from mobile terminals within their vicinity. Other components of a cellular network, for example, may also include base stations (not shown) that connect to the base station antennas and communicate with other devices, such as switches and routers (not shown) in accordance with known techniques.

Server 150 may include one or more processors or microprocessors enabled by software programs to perform functions, such as data storage and transmission, and interfacing with other servers (not shown), mobile terminals 110-130 and network 140, for example. Server 150 may also include a data storage memory, such as a random access memory (RAM) or another dynamic storage device that stores information related to receiving, processing and translating images and text received from mobile terminals 110-130, as described below.

Figure 2:
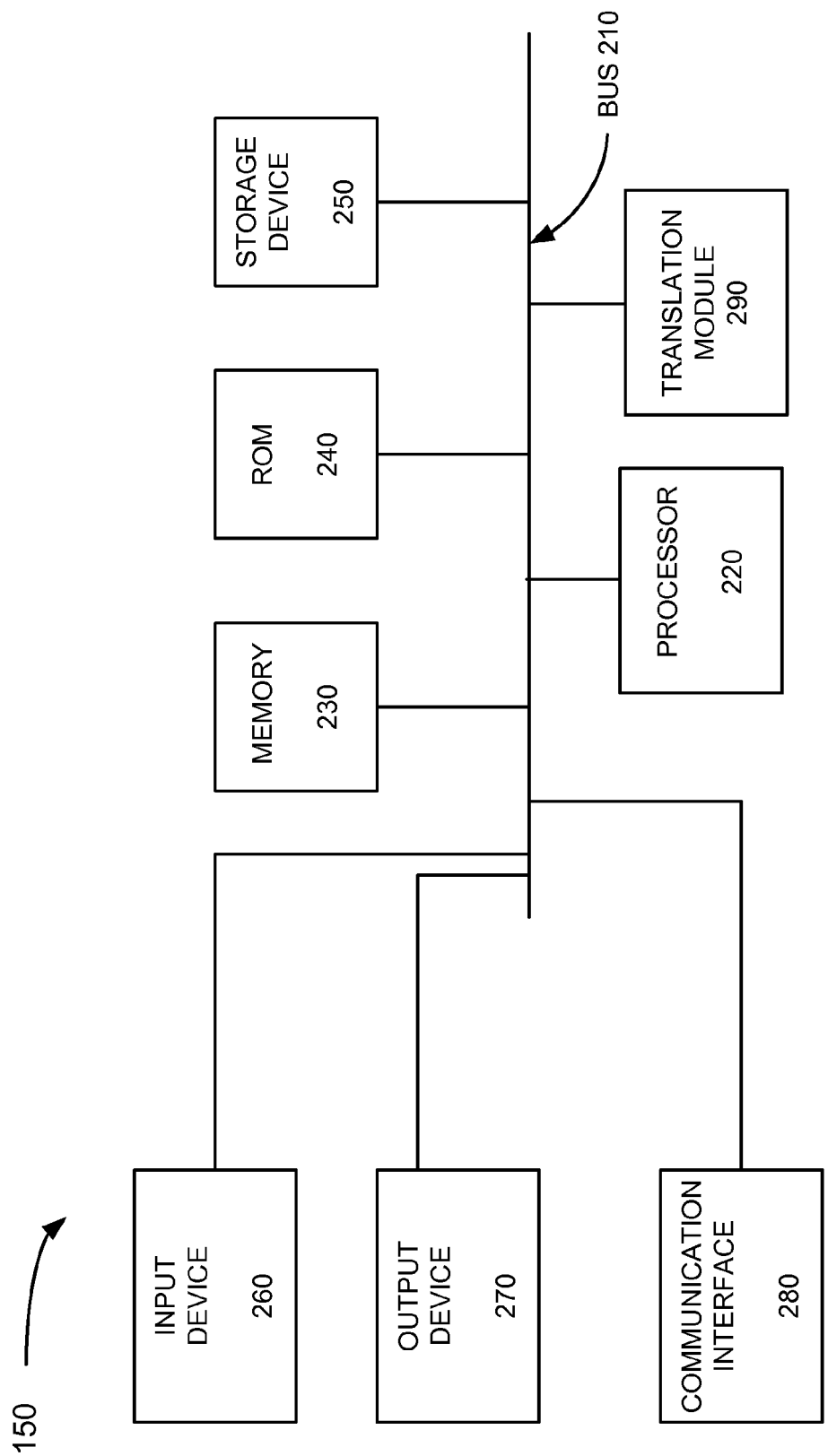
FIG. 2 is a diagram of an exemplary server of FIG. 1.

FIG. 2 is a diagram of an exemplary configuration of server 150. Server 150 may include bus 210, processor 220, a memory 230, a read only memory (ROM) 240, a storage device 250, an input device 260, an output device 270, a communication interface 280, and a translation module 290. Server 150 may also include one or more power supplies (not shown). One skilled in the art would recognize that server 150 may be configured in a number of other ways and may include other or different elements.

Bus 210 permits communication among the components of server 150. Processor 220 may include any type of processor, microprocessor, or processing logic that may interpret and execute instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more mechanisms that permit a user to input information to server 150, such as a keyboard, a mouse, a microphone, a pen, voice recognition and/or biometric mechanisms, etc. Output device 270 may include one or more mechanisms that output information to the user, including a display, a printer, etc.

Communication interface 280 may include any transceiver-like mechanism that enables server 150 to communicate with other devices and/or systems. For example, communication interface 280 may include a modem or an Ethernet interface to a LAN. Communication interface 280 may include other mechanisms for communicating via a network, such as network 140. For example, communication interface 280 may include one or more radio frequency (RF) transmitters, and one or more RF receivers and antennas for transmitting and receiving RF signals.

Translation module 290 may include hardware and/or software for receiving images and performing optical character recognition (OCR) processing on the received image to produce text. For example, translation module 290 may receive video streams or images transmitted from mobile terminal 110 and recognize and produce text from the received image (s). Translation module 290 may further contain filters and motion processing software to process received video streams before performing OCR processing. Translation module 290 may also store a dictionary for each language and may perform translations of text from one language to another. Translation module 290 may perform translation of text on a word by word basis or may translate text using grammatical and syntax rules, to perform translations in a sentence by sentence manner or a phrase by phrase basis. Processor 220 and/or translation module 290 may perform translation processing and may transmit translated text back to mobile terminal 110, via communication interface 280, for example.

According to an exemplary implementation, server 150 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices or carrier waves. Execution of the sequences of instructions contained in memory 230 causes processor 220 to perform the acts that will be described hereafter. In alternative embodiments, hardwired circuitry may be used in place of or in combination with software instructions to implement aspects of the embodiments. Thus, the systems and methods described herein are not limited to any specific combination of hardware circuitry and software.

Figure 3:
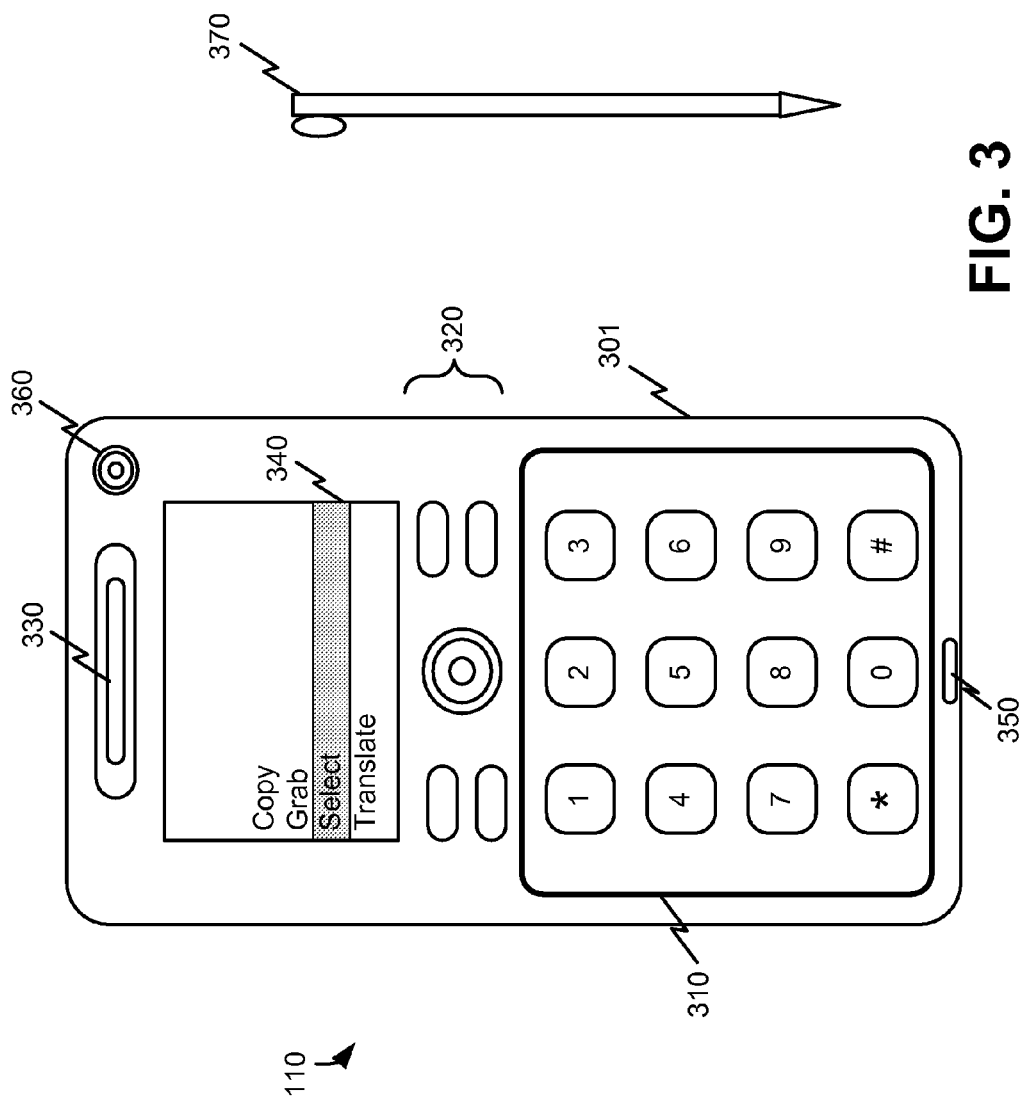
FIG. 3 shows an exemplary mobile terminal.

FIG. 3 illustrates an exemplary mobile terminal 110 that may include housing 301, keypad 310, control keys 320, speaker 330, display 340, microphone 350, camera 360 and stylus 370. Housing 301 may include a structure configured to hold devices and components used in mobile terminal 110. For example, housing 301 may be formed from plastic, metal, or composite and may be configured to support keypad 310, control keys 320, speaker 330, display 340, microphone 350, camera 360 and stylus 370.

Keypad 310 may include devices and/or logic that can be used to operate mobile terminal 110. Keypad 310 may further be adapted to receive user inputs, directly or via other devices, such as stylus 370 for entering information into mobile terminal 110. In one implementation, communication functions of mobile terminal 110 may be controlled by activating keys in keypad 310. Implementations of keys may have key information associated therewith, such as numbers, letters, symbols, etc. The user may operate keys in keypad 310 to place calls, enter digits, commands, and text messages into mobile terminal 110. Designated functions of keys may form and/or manipulate images that may be displayed on display 340.

Control keys 320 may include buttons that permit a user to interact with mobile terminal 110 to perform specified actions, such as to interact with display 340, etc. For example, a user may use control keys 320 to select from a menu of choices that may include selecting a translation mode.

Speaker 330 may include a device that provides audible information to a user of mobile terminal 110. Speaker 330 may be located anywhere on mobile terminal 110 and may function, for example, as an earpiece when a user communicates using mobile terminal 110. Speaker 330 may also function as an output device for playing music, or generating an alarm tone in an emergency, for example.

Display 340 may include a device that provides visual images to a user. For example, display 340 may display text to a user, such as a menu (as illustrated in FIG. 3). Display 340 may also display graphic information regarding incoming/outgoing calls, text messages, phonebooks, volume settings, etc., to a user of mobile terminal 110. Implementations of display 340 may be implemented as black and white or color displays, such as a liquid crystal display (LCD). In one implementation, display 340 may function as a user input interface, such as a touch-screen or panel enabled display. For example, display 340 may include a pressure-sensitive (e.g., resistive), electrically-sensitive (e.g., capacitive), acoustically-sensitive (e.g., surface acoustic wave), photo-sensitive (e.g., infra-red), and/or any other type of display overlay that allows the display to be used as an input device.

Microphone 350 may include a device that converts speech or other acoustic signals into electrical signals for use by mobile terminal 110. Microphone 350 may be located anywhere on mobile terminal 110 and may be configured, for example, to convert spoken words or phrases into electrical signals for use by mobile terminal 110.

Camera 360 may include any type of digital camera device that may enable a user to capture and store video and/or images (e.g., pictures).

Stylus 370 may include an accessory instrument that may be used to manipulate display 340, control keys 320, and/or keypad 310, for example, to enter data. In one implementation, stylus 370 may be a pointer or an inkless pen that may be used to "write" information onto or select text information or images presented on display 340. Stylus 370 may correspond to a type of touch-screen of display 340. For example, where display 340 includes a pressure-sensitive surface, stylus 370 may include an elongated shaft with a pointed end for contacting the surface of display 340. Additionally, where display 340 includes an electrically-sensitive surface, an acoustically-sensitive surface, or a photo-sensitive surface, stylus 370 may include an end that emits a charge, sound, or light, respectively, that may be directed to the surface of display 340. Stylus 370 may include one or more surface features and/or be contoured to facilitate grasping and/or handling by a user. Stylus 370 may be contained within a slot within housing 301 of mobile terminal 110, for example.

Figure 4:
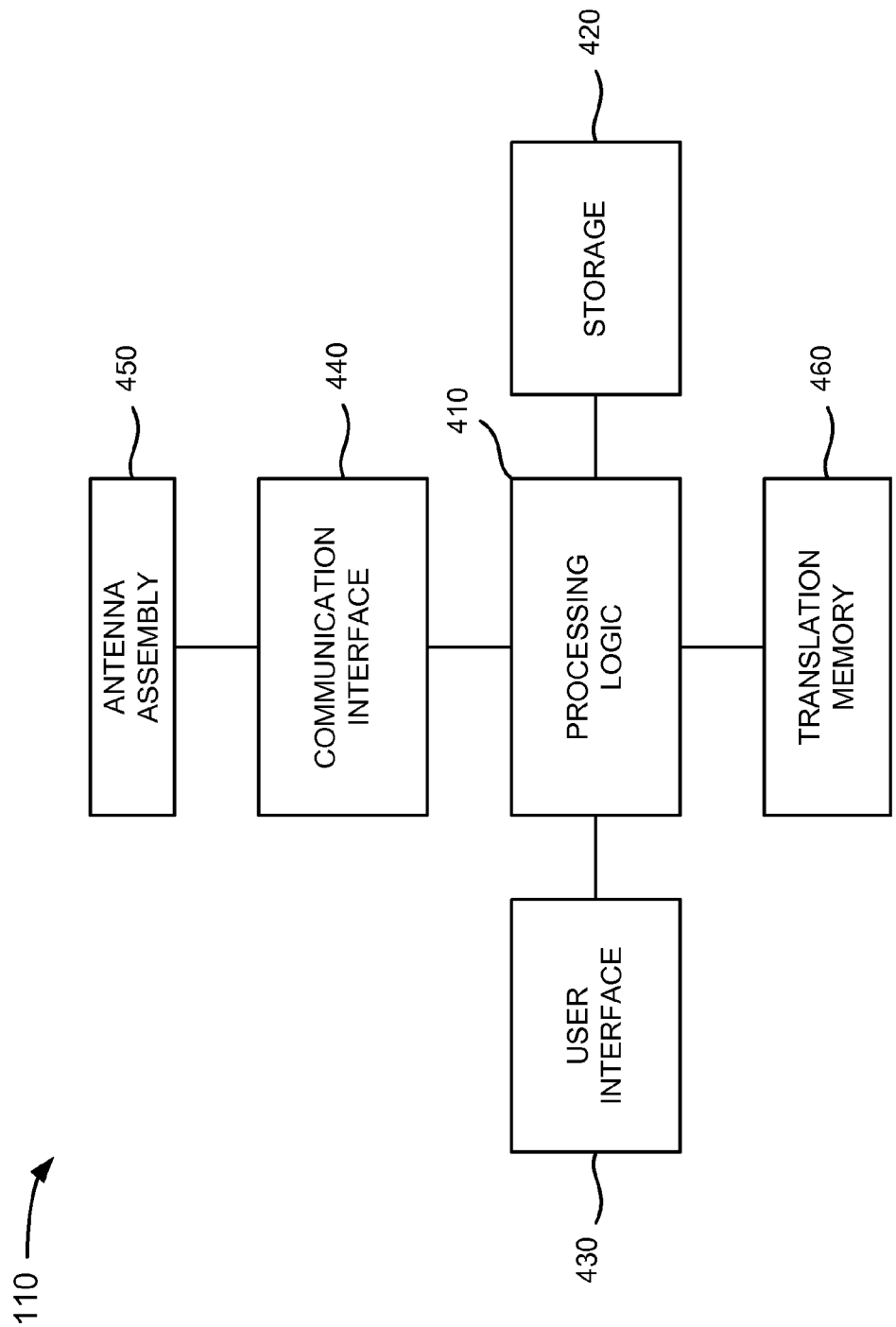
FIG. 4 is a diagram of an exemplary mobile terminal of FIG. 3.

FIG. 4 is a diagram of exemplary components of mobile terminal 110. As shown in FIG. 4, mobile terminal 110 may include processing logic 410, storage 420, user interface 430, communication interface 440, and antenna assembly 450, and translation memory 460. Processing logic 410 may include a processor, microprocessor, an application specific integrated circuit (ASIC), field programmable gate array (FPGA), or the like. Processing logic 410 may include data structures or software programs to control operation of mobile terminal 110 and its components. Storage 420 may include a random access memory (RAM), a read only memory (ROM), and/or another type of memory to store data and instructions that may be used by processing logic 410.

User interface 430 may include mechanisms for inputting information to mobile terminal 110 and/or for outputting information from mobile terminal 110. Examples of input and output mechanisms may include speaker 330 that receives electrical signals and outputs audio signals, microphone 350 that receives audio signals and outputs electrical signals, camera 360 that produces digital images, control buttons 320 and/or keys on keypad 310 that permits data and control commands to be input into mobile terminal 110, and display 340 that outputs visual information.

Communication interface 440 may include, for example, a transmitter that may convert baseband signals from processing logic 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and reception of the RF signals. Antenna assembly 250 may include one or more antennas to transmit and receive RF signals over the air. Antenna assembly 450 may receive RF signals from communication interface 440 and transmit them over the air and receive RF signals over the air and provide them to communication interface 440.

Translation memory 460 may include hardware and/or software for receiving images and performing optical character recognition (OCR) processing on the received image to produce text. For example, translation memory 460 may receive video streams or images from camera 360 and may recognize and produce text from the received image(s). Translation memory 460 may further contain filters and motion processing software to process received video streams before performing OCR processing. Translation memory 460 may also store a dictionary corresponding to each of a number of languages and may perform translations of text from one language to another. Translation memory 460 may perform translation of text on a word by word basis or may translate text using grammatical and syntax rules, to perform translations in a phrase by phrase manner, a sentence by sentence manner, etc.

As will be described in detail below, mobile terminal 110 may perform operations in response to processing logic 410 executing software instructions to display and transmit images using an application contained in a computer-readable medium, such as storage 420. A computer-readable medium may be defined as a physical or logical memory device and/or carrier wave.

The software instructions may be read into storage 420 from another computer-readable medium or from another device via communication interface 440. The software instructions contained in storage 420 may cause processing logic 410 to perform processes that will be described later. Alternatively, hardwired circuitry may be used in place of or in combination with software instructions to implement processes consistent with the embodiments. Thus, implementations described herein are not limited to any specific combination of hardware circuitry and software.

Figure 5:
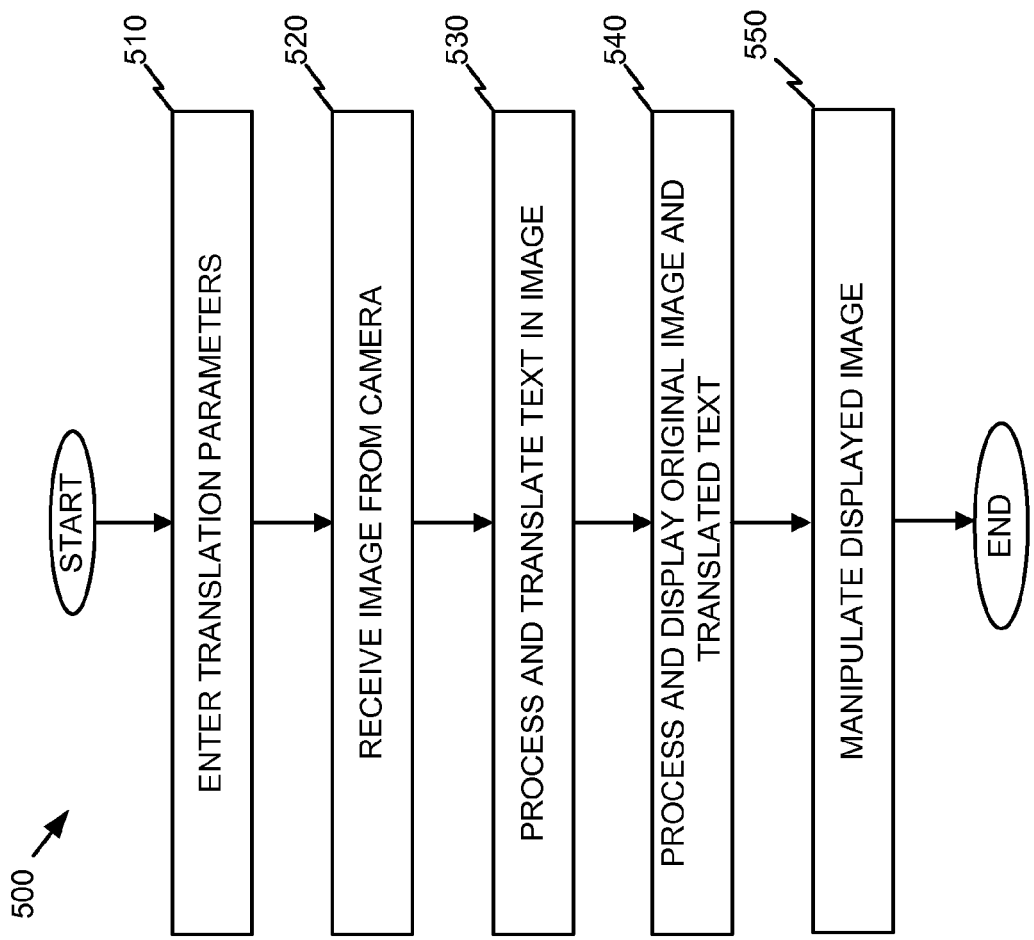
FIG. 5 is a flow diagram illustrating exemplary processing by a mobile terminal.

FIG. 5 illustrates exemplary processing 500 performed by mobile terminal 110. Processing may begin, for example, by entering translation information (act 510). For example, using control keys 320, a user of mobile terminal 110 may select a translation mode from a displayed menu, as shown in FIG. 3. Once in a translation mode, a user may enter or select languages used to translate "from" and "to," for example. For example, a user may be on vacation in a foreign country (e.g., Sweden) and desire to translate text "from" the foreign language (e.g., Swedish) "to" their native language of English. In this example, a user may enter translation information into mobile terminal 110 to translate from Swedish to English (act 510). In other embodiments, a user may enter or select only the language to be translated "to," as OCR processing may automatically recognize and identify the language of the text, for example. In still further embodiments, the selection of languages may be performed automatically using default settings or using an identification number of mobile terminal 110, or using GPS information relating to a position of mobile terminal 110 as described below.

Figure 6A:
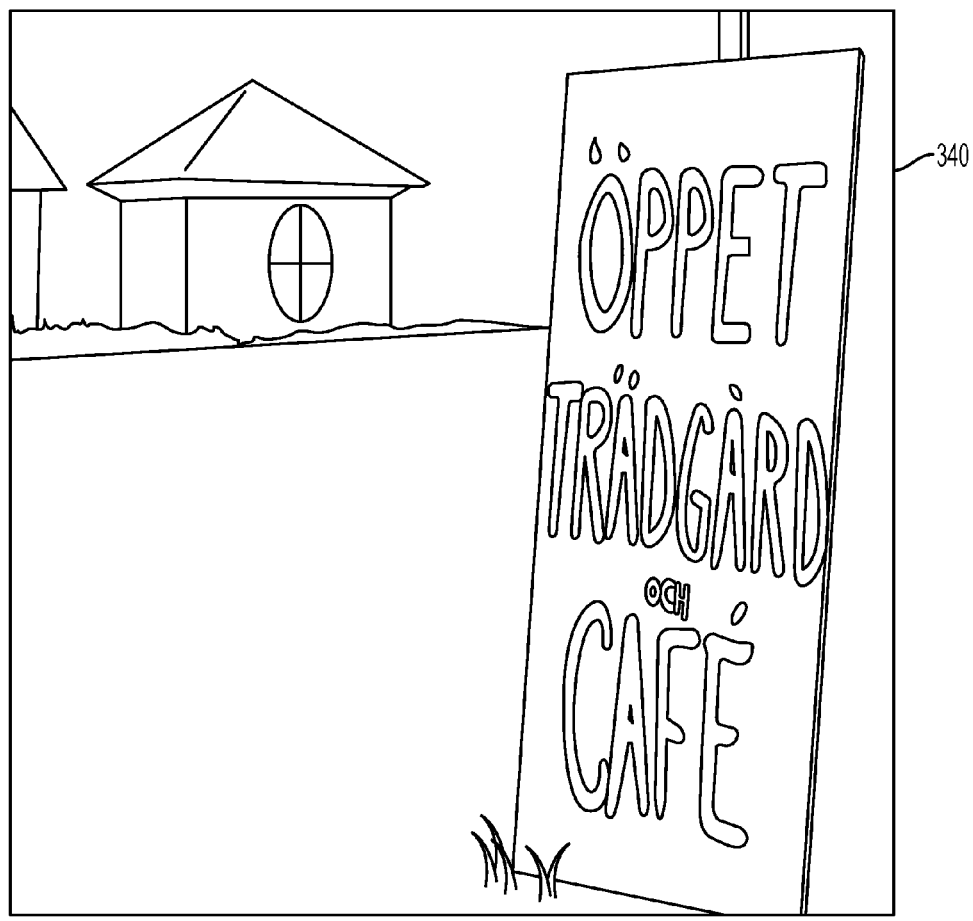
FIGS. 6A-6B illustrate exemplary displays on a mobile terminal.

Once the translation parameters have been entered, an image may be received from camera 360 (act 520). For example, the user of mobile terminal 110 may be in a foreign country and may desire to read text on a warning sign, the text of a sign located outside of a business, etc. In this example, the user may take a picture of the sign with camera 360. The image captured by camera 360 may then be received by processing logic 410 and translation memory 460 (act 520). An example of a received image that may be displayed via display 340 is shown in FIG. 6A. In this example, the language of the text on the sign is Swedish and the text "Oppet Tradgard och Café," translates to "Open Garden and Café" in English.

After the image has been received from the camera, the text contained in the received image may be processed and translated (act 530). For example, translation memory 460 may perform OCR processing on the received image (as shown in FIG. 6A) and recognize "Oppet Tradgard och Café" as Swedish text. After performing OCR processing on the received image, the recognized text may be translated into another language as determined from the entered translation parameters in act 510. In this example, assume that the English language has been selected as the language to which the text is to be translated. Translation memory 460 may then use a stored dictionary of words to translate "Oppet Tradgard och Café" from Swedish to "Open Garden and Café" in English. In other embodiments, the received image from camera 360 may be transmitted from mobile terminal 110 to server 150 for text processing and translation (to perform act 530) as described above. For example, translation module 290 in server 150 may perform OCR processing on the received image or video stream to recognize text and may translate the recognized text into another identified language. Server 150 may then transmit the translated text back to mobile terminal 110, via communication interface 280. In other embodiments, server 150 may also receive an identification number and/or position of mobile terminal 110 that may be used to select the languages used in the translation process. For example, if a received position of mobile terminal 110 is determined to be in France, French may be selected as a source language. Also for example, server 150 may associate an identification number of mobile terminal 110 with a target language such as German, where transmissions received from this mobile terminal may automatically be translated to German.

Figure 6B:
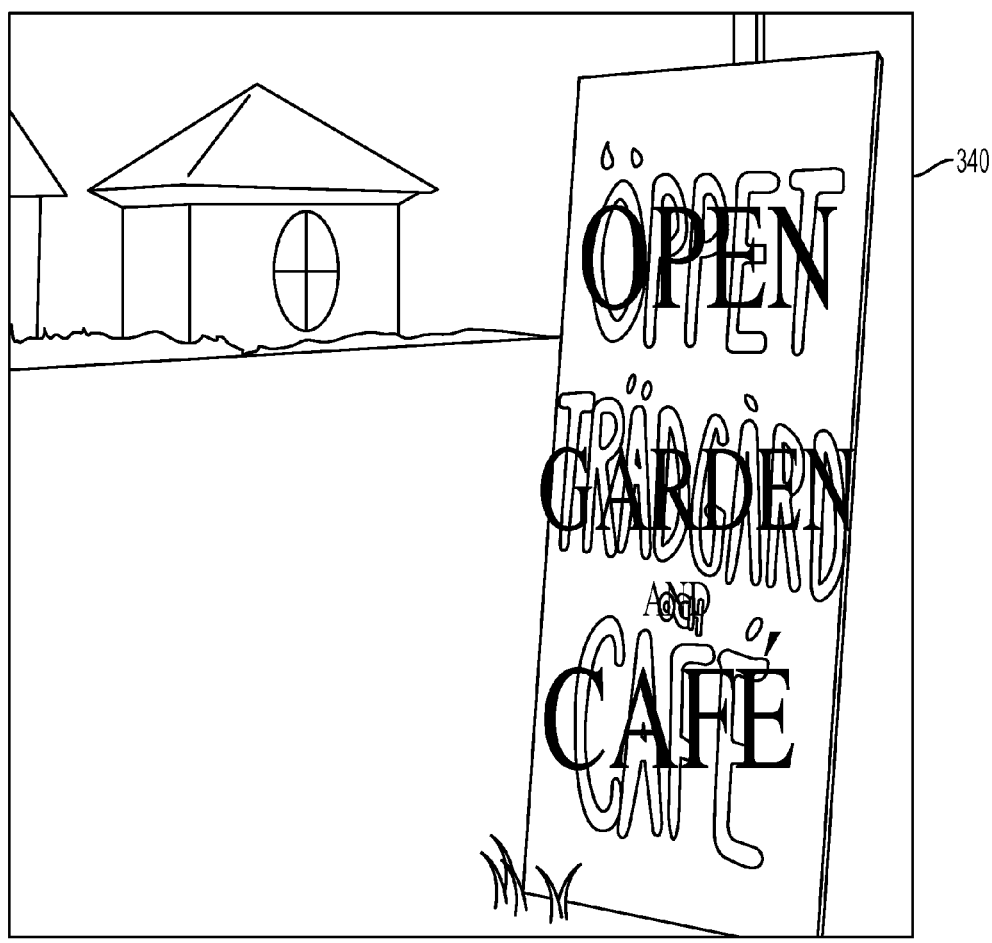

Once the text has been processed and translated, the original image may be processed and displayed with the translated text (act 540). For example, as shown in FIG. 6B, the original image may be dimmed or shown in a lighter or different display mode and the translated text ("Open Garden and Café") may be superimposed on the display of the original image. The translated text may be displayed via display 340 in a darkened, bolded manner, or highlighted in some other manner to be more prominent than the original text in order to be clearly visible to the user of mobile terminal 110. For example, the original image may be shown in a grayscale manner, where each pixel's intensity (shade of gray) may be reduced to make the displayed translated text more visible (act 540).

After processing and displaying the image with the translated text, a user of mobile terminal 110 may then manipulate the displayed image (act 550). For example, using stylus 370 or control keys 320, the text displayed in FIG. 6B may be reduced or enlarged in size, or may be rotated. The text or selected portions of text may also be translated to another selected language or may be used within another application contained in mobile terminal 110. For example, the text may be used in a notes application contained within mobile terminal 110. That is, the text "Open Garden and Café," of "Oppet Tradgard och Café" may be selected and copied to a notes application program, an email message, a short message service (SMS) message, etc. In still further embodiments, the displayed image may be further manipulated by selecting to dim the displayed translated text in order to generate and display the originally received image, or the original received image may be completely dimmed out leaving only the translated text to be displayed.

Figure 7:
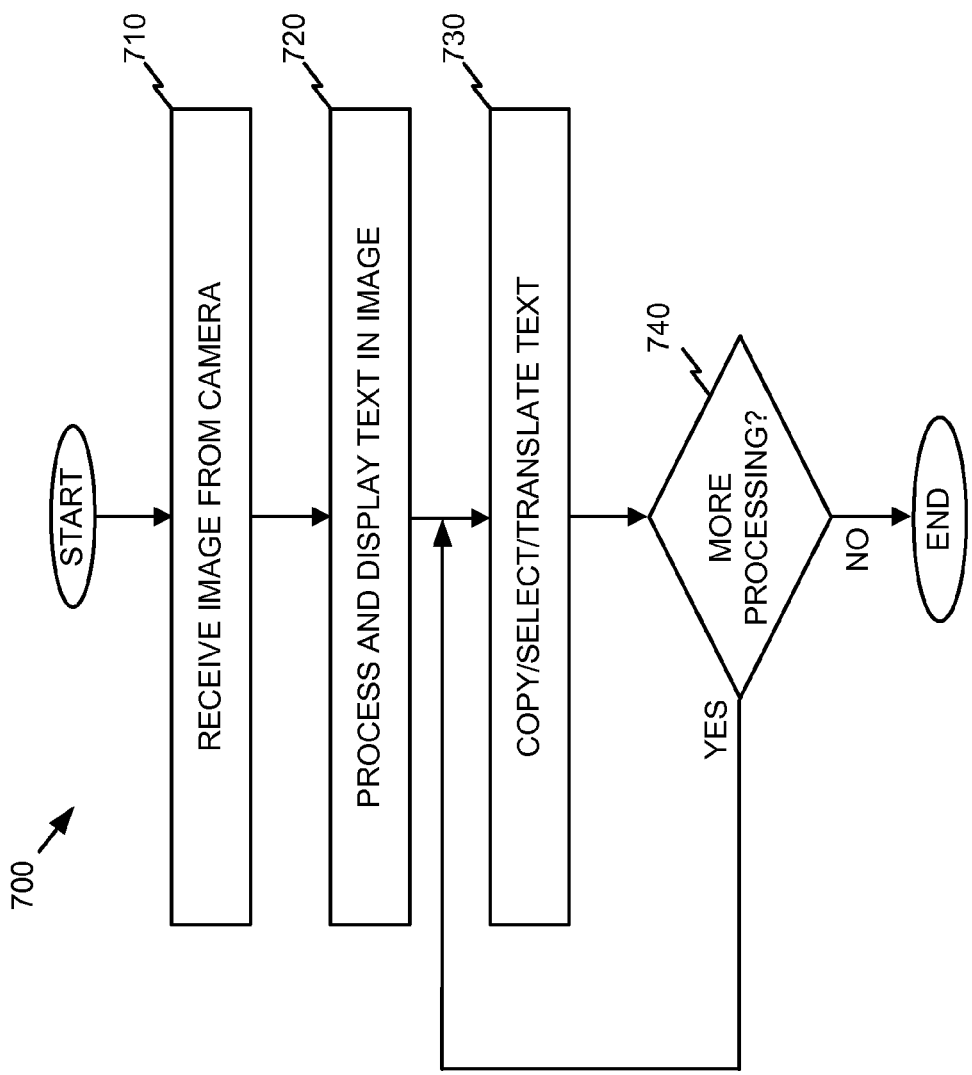
FIG. 7 is a flow diagram illustrating additional exemplary processing by a mobile terminal.
Figures 8A, 8B, 8C, 8D:
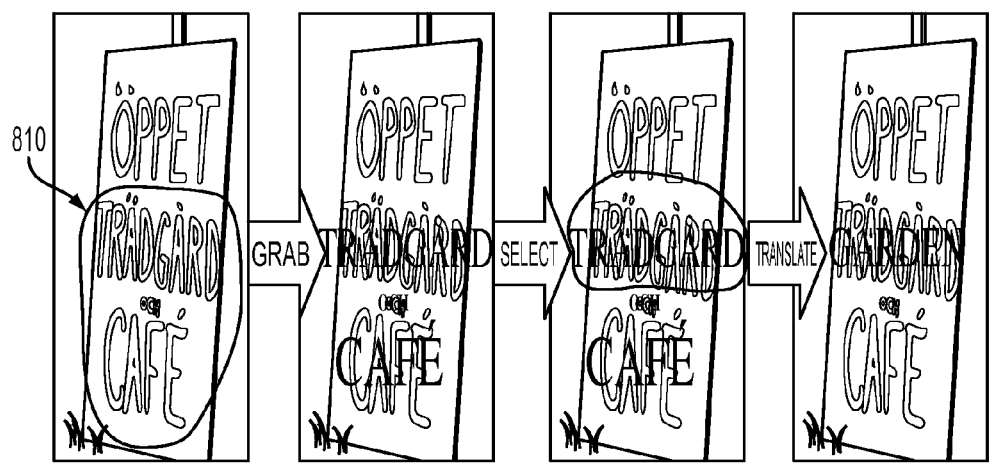
FIGS. 8A-8D illustrate exemplary displays on a mobile terminal.

FIG. 7 illustrates additional exemplary processing 700 performed by mobile terminal 110. Processing may begin, for example, by receiving an image from camera 360 (act 710). For example, the user of mobile terminal 110 may use camera 360 to take a picture that may contain text within the image. The image produced by camera 360 may then be received by processing logic 410 and translation memory 460. An example of a received image (as shown via display 340) is shown in FIG. 8A. In this example, the received image contains Swedish text "Oppet Tradgard och Café."

Once the image has been received, the text within the image is processed and displayed (act 720). For example, using stylus 370, a user may enclose or circle text within the received image, as illustrated by enclosure 810 in FIG. 8A, where the enclosed text may be processed and identified by OCR processing. In this example, processing logic 410 and translation memory 460 may produce a display as shown in FIG. 8B. That is, translation memory 460 has converted the selected portion of the text in the image in FIG. 8A to text using OCR. The text may then be further processed. In this example, as the user has encircled the text "Tradgard och Café," this is the text displayed in a bolded manner in FIG. 8B. Since the word "Oppet" was not encircled by enclosure 810, this word was not processed and displayed as text. As described above in FIG. 5, the displayed text in act 720 may be superimposed over the originally received image, where the originally received image may be displayed in a dimmed or lighter manner. Also for example, a user may move camera 360 across a page of text to produce a video stream of images associated with a page of text. Using stylus 370, for example, a user may underline, highlight or encircle text within the real-time video stream in order to select portions of the image for performing OCR processing for text/translation purposes.

Figure 9A:
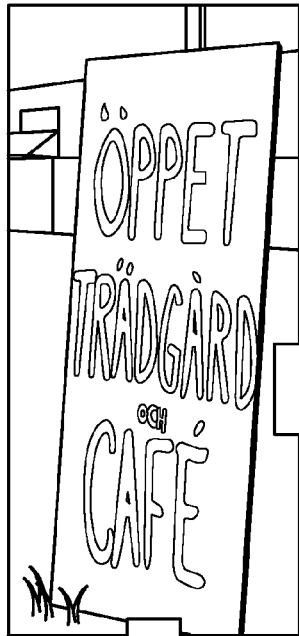
FIGS. 9A-9F illustrate exemplary displays on a mobile terminal.
Figure 9B:
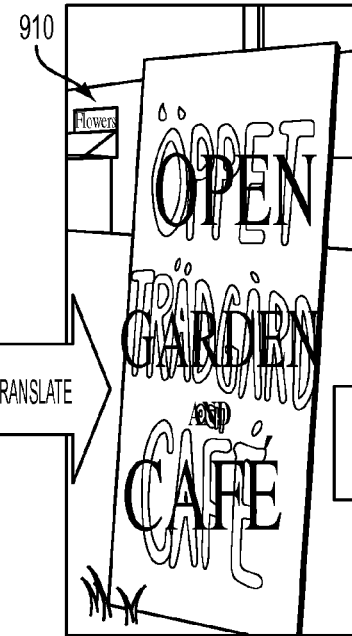
Figure 9C:
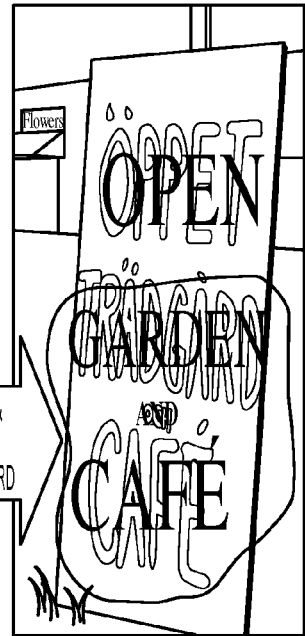
Figure 9D:
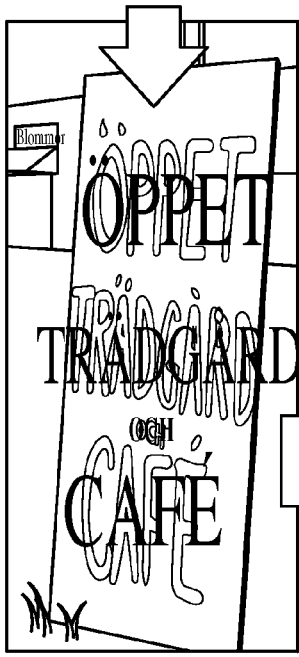

In other embodiments, all the text that is contained in an image and recognized by OCR processing may be automatically displayed in the native language (act 720). FIGS. 9A and 9D show an example of automatically recognizing, processing and displaying text. FIG. 9A shows the received image (act 710) and in this example, all the text within the image may be automatically processed and displayed as shown in FIG. 9D (act 720).

In other embodiments, text contained in a video stream of images may be recognized by OCR processing and may be automatically displayed in the native language (act 720). For example, a user of mobile terminal 110 may capture a video stream of images by moving camera 360 across a line of text in a book (act 710). In this embodiment, translation memory 460 may perform OCR processing on each frame of the video stream image. Assuming for example that camera 360 produces 15 frames (images) per second, scanning a line of text in over a one second period may produce 15 images, each of which may be processed by OCR. In this example, each word in the scanned images of the line of text may be identified and tracked. For example, the scanned line of text may contain 8 words, and each identified word may be tracked and numbered (1-8). In addition, OCR processing of the identified words in each image may be stored in translation memory 460. For example, if the German word "wagen" was the third word contained in the scanned line of text, and the word appeared in 7 of the 15 images, the tracked word may be numbered as "3" and identified (seven times) as "wagen," "wagen," "wagon," "zoom," "wegen," "fgun" and "vagon." Translation memory 460 may include a first-in-first-out (FIFO) buffer, to store each OCR processing output of each identified (or numbered) word. Storing multiple OCR processed words for each tracked and identified word provides a "filtering effect" of the identified words. In this example, as the word "wagen" appears more often than any other OCR processed word stored in the FIFO buffer, the word "wagen" may be provided as text by translation memory 460 (act 720). In other examples, the text in a video stream may be displayed immediately without providing multiple OCR processing and filtering of words.

In further embodiments, all the recognized text within a received image may be automatically processed, translated and displayed (act 720). For example, FIG. 9A shows the received image (act 710) and FIG. 9B shows automatically providing and displaying translated text of all the text recognized in the received image (act 720). In this embodiment, the text corresponding to the Swedish word for flowers (illustrated as 910 in FIG. 9B) has been illustrated as the English word "flowers" in addition to the translation of Open Garden and Café. In this example, the text is originally displayed in a size that is similar in size to the text in the original image. Using high resolution images for example, selected and displayed text (such as the word flowers in this example) may be made larger (zoom function) without distortion, if desired by a user. This embodiment may be enabled for example, by activating a "translate" button twice or selecting a "translate all" function from a menu provided via display 340.

In still further embodiments, text contained in a video stream of images may be recognized by OCR processing and may be automatically translated and displayed (act 720). Referring to example above scanning a line of text containing the word "wagen," if the selected OCR processing language is German and the selected translated to language is English, the word "wagen" may be OCR processed, filtered and identified by translation memory 460, as described above. As a translation mode has been selected, the word "car" (English) may be provided and displayed over the identified word "wagen," (German) as the video stream of images is displayed (act 720).

Figure 9E:
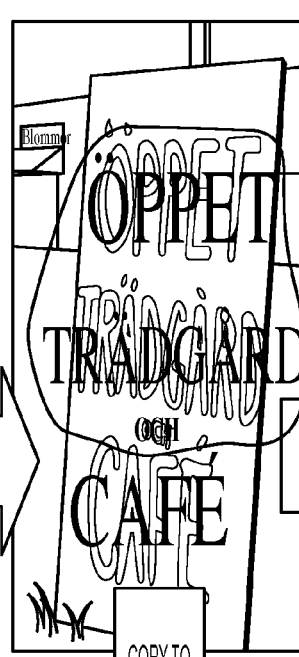

After all or some of the text in the received image has been processed and displayed in any of the exemplary embodiments described above, the text may be copied, selected or translated (act 730). For example, using stylus 370, a user may circle text "Tradgard," to select this text as shown in FIG. 8C. FIGS. 9C and 9E also show displays of text where the encircled text has been selected (act 730). Also for example, a user may use stylus 370 to encircle more than one area of text. For example, a user may have taken a picture of the front page of a newspaper and may have encircled two separate headlines (act 730). In this example, both the encircled portions of text may be selected or copied into a notes application or another application executed by mobile terminal 110.

Figure 9F:

After text has been selected (act 730), it is determined if more text processing is to be performed (act 740). For example, if a user of mobile terminal 110 actuates another control key 320 or uses stylus 370 to activate another text processing feature (e.g. act 740 "Yes"), further processing may be performed. For example, a user may have selected text "Tradgard," as shown in FIG. 8C, and may further process this selected text by translating the text as shown in FIG. 8D. As shown in FIG. 8D, the word "Tradgard," has been translated to the word "garden" and may be displayed via display 340. FIGS. 9E and 9F also show examples of further text processing (act 740). In these examples, text selected in act 730 may be further processed by being copied to a clipboard function or may be translated. Once copied, text may be used in a short messaging service (SMS) text message, an instant message, an email etc., or may be incorporated into another application in mobile terminal 110. For example, copied text such as names, phone numbers and appointments, may be inserted into a contact list or calendar application. Text may also be further processed by being edited before being copied into a message, for example.

Conclusion

Implementations consistent with the systems and methods described herein allow users of mobile terminals to identify and translate text within images. The text and images may also be further processed by the mobile terminals.

The foregoing description of the embodiments provides illustration and description, but is not intended to be exhaustive or to limit implementations to the precise form disclosed. Modifications and variations are possible in light of the above teachings or may be acquired from practice of the implementations.

For example, the embodiments have been described in the context of a mobile terminals communicating over a network and employing text translation features. The embodiments may be implemented in other devices or systems and/or networks. In addition, in some embodiments, functions described above as being performed by mobile terminal 110 or server 150 may be performed by other devices, such as one of the other mobile terminals. For example, a mobile terminal without text translation capabilities may forward an image to another mobile terminal that has text translation capabilities.

Further, while series of acts have been described with respect to FIGS. 5 and 7, the order of the acts may be varied in other implementations. Moreover, non-dependent acts may be performed in parallel.

It will also be apparent to one of ordinary skill in the art that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the systems and methods described unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention described herein is defined by the claims and their equivalents.

What is claimed is:

1. A method performed by a mobile communication terminal, the method comprising:
    displaying, via one or more devices of the mobile communication terminal, an image provided by one or more devices of the mobile communication terminal;
    receiving, at one or more devices of the mobile communication terminal, a first user selection of a portion of the image, wherein the first user selection corresponds to original text included in the image;
    transmitting, from the mobile communication terminal to a server via a network, the image, including an indication of the selected portion, to be processed at the server to identify the original text contained in the selected portion of the image;
    superimposing displaying, via one or more devices of the mobile communication terminal, the identified text, received from the server, over the selected portion of the image corresponding to the original text;
    receiving, at one or more devices of the mobile communication terminal, a second user selection of at least some of the identified text;
    transmitting, from the mobile communication terminal to the server via the network, text corresponding to the second user selection, and translation parameters, associated with the mobile communication terminal, to be processed at the server in translating the text corresponding to the second user selection from a first language into a second language that differs from the first language; and
    superimposing displaying, by one or more devices of the mobile communication terminal, the text corresponding to the second user selection, in the second language, received from the server, over the selected portion of the image corresponding text.

2. The method of claim 1, further comprising:
    receiving, from the server, the identified text based on optical character recognition (OCR) processing on the image.

3. The method of claim 1, further comprising sending position information, for the mobile communication terminal, to the server; and
    receiving, from the server, the text corresponding to the second user selection, in the second language based on processing of the position information.

4. The method of claim 1, further comprising:
    sending identification information, for the mobile communication terminal, to the server; and
    receiving, from the server, the text corresponding to the second user selection, in the second language, based on the identification information.

5. The method of claim 1, wherein the image includes at least one of a digital image or a video stream.

6. The method of claim 1, wherein the translation parameters include an identification number and position information for the mobile communication terminal to be used in translating the at least some of the text corresponding to the second user selection from the first language into the second language.

7. A mobile communication terminal, comprising:
    a camera configured to produce an image;
    a display; and
    a processor to:
        control the display to display the image;
        receive a first user selection of a portion of the image, wherein the portion of the image includes original text;
        recognize the original text contained in the selected portion of the image;
        control the display to present the recognized text over the selected portion of the image;
        receive a second user selection of at least some of the identified text;
        translate the identified text in the second user selection, using translation parameters associated with the mobile communication terminal, from a first language into a second language that differs from the first language; and
        control the display to superimpose and display the translated text, in the second language, over the portion of the image corresponding to the second user selection.

8. The mobile communication terminal of claim 7, wherein the processor is further to:
    superimpose the translated text over the portion of the image corresponding to the second user selection, such that the original text is visible behind the translated text.

9. The mobile communication terminal of claim 7, wherein the processor is further to:
    recognize the original text based on OCR (optical character recognition) processing.

10. The mobile communication terminal of claim 9, wherein the processor is further to:
    determine geographical position information associated with the mobile communication terminal; and identify the second language based on the geographical position information.

11. The mobile communication terminal of claim 7, wherein the processor is further to:
control the display to display the translated text in substantially the same size as the original text contained in the image.

12. The mobile communication terminal of claim 11, wherein the processor is further to:
control the display to present the translated text in a dimmed or less prominent manner than the original text contained in the image.

13. A method performed by a mobile communication terminal, the method comprising:
capturing, by one or more devices of the mobile communication terminal, an image;
obtaining, by one or more devices of the mobile communication terminal, location information, associated with the image, based on position information for the mobile communication terminal;
displaying, via one or more devices of the mobile communication terminal, the image;
receiving, at one or more devices of the mobile communication terminal, a user selection of a portion of the image containing text;
transmitting, from the mobile communication terminal to a server via a network:
the image and an indication of the selected portion of the image,
the location information, and
an identification number for the mobile terminal, to be used by the server in selecting a first language related to the location information and translating the text from the first language into a second language associated with the identification number, wherein the second language differs from the first language; and
superimposing and displaying, by one or more devices of the mobile communication terminal, the text in the second language, received from the server, over the portion of the image containing text.

14. The method of claim 13, wherein the superimposed and displayed text in the second language includes more than one size of text.

* * * * *

UNITED STATES PATENT AND TRADEMARK OFFICE
CERTIFICATE OF CORRECTION

PATENT NO. : 8,144,990 B2
APPLICATION NO. : 11/689673
DATED : March 27, 2012
INVENTOR(S) : Håkan Mats Englund et al.

It is certified that error appears in the above-identified patent and that said Letters Patent is hereby corrected as shown below:

Claim 1, column 12, line 4, add "and" after "superimposing."

Claim 1, column 12, line 8, add "to the original" after "corresponding."

Signed and Sealed this
Twenty-ninth Day of May, 2012

David J. Kappos
*Director of the United States Patent and Trademark Office*